United States Patent
Mikoshiba et al.

(12)

(10) Patent No.: US 6,384,321 B1
(45) Date of Patent: May 7, 2002

(54) ELECTROLYTE COMPOSITION, PHOTOSENSITIZED SOLAR CELL USING SAID ELECTROLYTE COMPOSITION, AND METHOD OF MANUFACTURING PHOTOSENSITIZED SOLAR CELL

(75) Inventors: Satoshi Mikoshiba, Kanagawa-ken; Hiroyasu Sumino, Tokyo; Maki Yonetsu; Shuji Hayase, both of Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/667,562

(22) Filed: Sep. 22, 2000

(30) Foreign Application Priority Data

Sep. 24, 1999 (JP) .............................. 11-269762

(51) Int. Cl.$^7$ ..................... H01L 31/04; H01L 31/0256; H01M 6/16
(52) U.S. Cl. ................. 136/263; 136/256; 136/262; 429/111; 429/189; 429/300; 429/303; 429/328; 429/324; 429/199; 257/40; 257/461; 438/82; 438/57; 252/62.2
(58) Field of Search ................. 136/263, 256, 136/252; 429/111, 189, 300, 303, 328, 324, 199; 257/40, 461; 438/82, 57; 252/62.2

(56) References Cited

U.S. PATENT DOCUMENTS 5,683,832 A  * 11/1997  Bonhote et al. ............ 429/111
6,171,522 B1 *  1/2001  Michot et al. .............. 252/500

FOREIGN PATENT DOCUMENTS

JP         9-27352      1/1997
WO     WO-98/11619 A1 *  3/1998

OTHER PUBLICATIONS

Fei CAO et al, "A Solid State, Dye Sensitized Photoelectrochemical Cell", *J. Phys. Chem.*, 1995, 99, pp. 17071–17073.

Wataru Kubo et al, "Fabrication fo Quasi–solid–state Dye–sensitized TiO$_2$ Solar Cells Using Low Molecular Weight Gelators", *Chemistry Letters*, 1998, pp. 1211–1212.

Masamitsu Matsumoto et al, "A dye sensitized TiO$_2$ photo-electrochemical cell constructed with polymer solid electrolyte", *Solid State Ionics*, 89 (1996), pp. 263–267.

* cited by examiner

Primary Examiner—Alan Diamond
(74) Attorney, Agent, or Firm—Oblon, Spivak, McClelland, Maier & Neustadt, P.C.

(57) ABSTRACT

The present invention provides an electrolyte composition, comprising an electrolyte containing at least one kind of an imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide, a halogen-containing compound dissolved in the electrolyte, and a compound dissolved in the electrolyte and containing at least one element selected from the group consisting of N, P and S, the compound being capable of forming an onium salt together with the halogen-containing compound.

25 Claims, 2 Drawing Sheets

ELECTROLYTE COMPOSITION, PHOTOSENSITIZED SOLAR CELL USING SAID ELECTROLYTE COMPOSITION, AND METHOD OF MANUFACTURING PHOTOSENSITIZED SOLAR CELL

CROSS-REFERENCE TO RELATED APPLICATIONS

This application is based upon and claims the benefit of priority from the prior Japanese Patent Application No. 11-269762, filed Sep. 24, 1999, the entire contents of which are incorporated herein by reference.

BACKGROUND OF THE INVENTION

The present invention relates to an electrolyte composition, a photosensitized solar cell using said electrolyte composition, and a method of manufacturing a photosensitized solar cell using said electrolyte composition.

The general structure of a photosensitized solar cell is described in, for example, Japanese Patent Disclosure (Kokai) No. 1-220380. It is described that the solar cell comprises an electrode (oxide electrode) consisting of a transparent semiconductor layer consisting of fine particles of a metal oxide and supporting a dye on the surface, a transparent electrode arranged to face the oxide electrode, and a liquid carrier movement layer-interposed between these two electrodes. Since the carrier movement layer is liquid, the solar cell of this type is called a wet type photosensitized solar cell.

The photosensitized solar cell is operated as follows. Specifically, the light incident on the transparent electrode runs to reach the dye supported on the surface of the transparent semiconductor layer so as to excite the dye. The excited dye promptly delivers electrons to the transparent semiconductor tug layer. On the other hand, the dye charged positive by the loss of electrons receives electrons from the ions diffused from the carrier movement layer so as to be neutralized electrically. The ions that have delivered the electrons are diffused into the transparent electrode so as to receive electrons. The oxide electrode and the transparent electrode positioned to face the oxide electrode act as a negative electrode and a positive electrode, respectively, so as to permit the wet type photosensitized solar cell to be operated.

In the wet type photosensitized solar cell, it is necessary to use a solvent having a low molecular weight and to apply shielding strictly so as to prevent the liquid leakage. However, it is difficult to maintain the shielded state for many years. It is worried about that, by the liquid leakage and evaporation of the solvent molecules, the function of the element may be deteriorated and an air pollution or water contamination may be brought about. Such being the situation, it is proposed to use an ionic conduction type solid electrolyte, which does not contain a solvent of a low molecular weight, or an electron conduction type solid organic material, which does not contain a solvent of a low molecular weight, in place of the liquid carrier movement layer. The solar cell of this type is called a full-solid-state photosensitized solar cell.

The solid-state photosensitized solar cell is certainly free from the problem of the liquid leakage. However, new problems are brought about. Specifically, the electrical resistance is increased. In addition, the solid electrolyte fails to enter sufficiently the clearances among $TiO_2$ particles having a large specific surface area, thereby the contact between the $TiO_2$ particles and the electrolyte is rendered insufficient. As a result, the energy conversion efficiency is lowered. Also, since the semiconductor electrode and the solid conductive material differ from each other in the thermal expansion coefficient, the bonding interface between the semiconductor electrode and the solid conductive material tends to peel off in the course of the beat cycle, leading to deterioration in the energy conversion efficiency.

As described above, the wet type photosensitized solar cell is defective in that leakage tends to be generated in the liquid carrier movement layer and that the solvent to be evaporated. On the other hand, the full-solid-state photosensitized solar cell is defective in that the electrical resistance is increased, that contact between the $TiO_2$ particles and the electrolyte is insufficient, and that the bonding interface between the semiconductor electrode and the solid conductive material tends to be peeled because of the heat cycle.

Under the circumstances, proposed is a photosensitized solar cell provided with a gel electrolyte. The gel electrolyte contains an electrolyte consisting of iodine and an iodide, an organic solvent for dissolving the electrolyte, and a gelling agent. In other words, a solvent for dissolving iodine consists of the organic solvent.

However, the organic solvent tends to be dissipated to the outside through the sealing portion of the solar cell. It follows that the photosensitized solar cell comprising the gel electrolyte of the composition described above gives rise to the problem that the composition of the gel electrolyte is changed by the evaporation of the organic solvent, leading to a low energy conversion efficiency.

BRIEF SUMMARY OF THE INVENTION

The present invention is intended to provide an electrolyte composition capable of improving the energy conversion efficiency of a solar cell and also capable of obtaining a high energy conversion efficiency when the solar cell is used under an environment of a high temperature, a photosensitized solar cell comprising the particular electrolyte composition, and a method of manufacturing the particular photosensitized solar cell.

According to a first aspect of the present invention, there is provided an electrolyte composition, comprising:

an electrolyte containing at least one kind of an imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide;

a halogen-containing compound dissolved in the electrolyte; and a compound dissolved in the electrolyte and containing at least one element selected from the group consisting of N, P and S. the compound being capable of forming an onium salt together with the halogen-containing compound.

According to a second aspect of the present invention, there is provided a photosensitized solar cell, comprising an n-type semiconductor electrode having a surface on which a dye is adsorbed; a counter substrate arranged to face the n-type semiconductor electrode; a conductive film formed on that surface of the counter substrate which faces the n-type semiconductor electrode; and a gel electrolyte serving to relay the charge transfer between the conductive film and the n-type semiconductor electrode, the gel electrolyte containing a polymer of an onium salt formed between a halogen-containing compound and a compound containing at least one element selected from the group consisting of N, P and S, and an electrolyte containing at least one kind of an imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide, and 1-methyl-3-sec-butyl imidazolium iodide.

Further, according to a third aspect of the present invention, there is provided a method of manufacturing a photosensitized solar cell comprising an n-type semiconductor electrode having a surface on which a dye is adsorbed, a counter substrate arranged to face the n-type semiconductor electrode, a conductive film formed on that surface of the counter substrate which faces the n-type semiconductor electrode, and a gel electrolyte serving to relay the charge transfer between the conductive film and the n-type semiconductor electrode, the method comprising the steps of:

allowing an electrolyte composition to be injected into a gap between the n-type semiconductor electrode and the conductive film and to permeate the n-type semiconductor electrode, and the electrolyte composition which comprises an electrolyte containing at least one kind of an imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide, a halogen-containing compound dissolved in the electrolyte and a compound dissolved in the electrolyte and containing at least one element selected from the group consisting of N, P and S, and the compound being capable of forming an onium salt together with the halogen-containing compound; and forming a polymer of an onium salt between the compound containing the at least one element and the halogen-containing compound so as to allow the electrolyte composition to gel, thereby obtaining a gel electrolyte.

According to an aspect of the present invention, there is provided an electrolyte composition, comprising:

an electrolyte containing a reversible redox couple;

a halogen-containing compound dissolved in the electrolyte; and a compound dissolved in the electrolyte, capable of forming an onium salt together with the halogen-containing compound, and having at least one kind of a nitrogen-containing atomic group selected from the group consisting of primary amino group, secondary amino group and tertiary amino group.

According to another aspect of the present invention, there is provided a photosensitized solar cell, comprising:

an n-type semiconductor electrode having a surface on which a dye is adsorbed;

a counter substrate arranged to face the n-type semiconductor electrode;

a conductive film formed on that surface of the counter substrate which faces the n-type semiconductor electrode; and a gel electrolyte serving to relay the charge transfer between the conductive film and the n-type semiconductor electrode, and gel electrolyte containing a polymer of an onium salt formed between a halogen-containing compound and a compound having at least one kind of a nitrogen-containing atomic group selected from the group consisting of primary amino group, secondary amino group and tertiary amino group, and an electrolyte containing a reversible redox couple.

Further, according to still another aspect of the present invention, there is provided a method of manufacturing a photosensitized solar cell comprising an n-type semiconductor electrode having a surface on which a dye is adsorbed, a counter substrate arranged to face the n-type semiconductor electrode, a conductive film formed on that surface of the counter substrate which faces the n-type semiconductor electrode, and a gel electrode serving to relay the charge transfer between the conductive film and the n-type semiconductor electrode, the method comprising the steps of:

allowing an electrolyte composition to be injected into a gap between the n-type semiconductor electrode and the conductive film and to permeate the n-type semiconductor electrode, the electrolyte composition containing an electrolyte containing a reversible redox couple, a halogen-containing compound dissolved in the electrolyte, and a compound dissolved in the electrolyte and capable of forming an onium salt together with the halogen-containing compound, and the compound having at least one kind of a nitrogen-containing atomic group selected from the group consisting of primary amino group, secondary amino group and tertiary amino group; and forming a polymer of an onium salt between the compound having the at least one kind of the nitrogen-containing atomic group and the halogen-containing compound so as to allow the electrolyte composition to gel, thereby obtaining a gel electrolyte.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
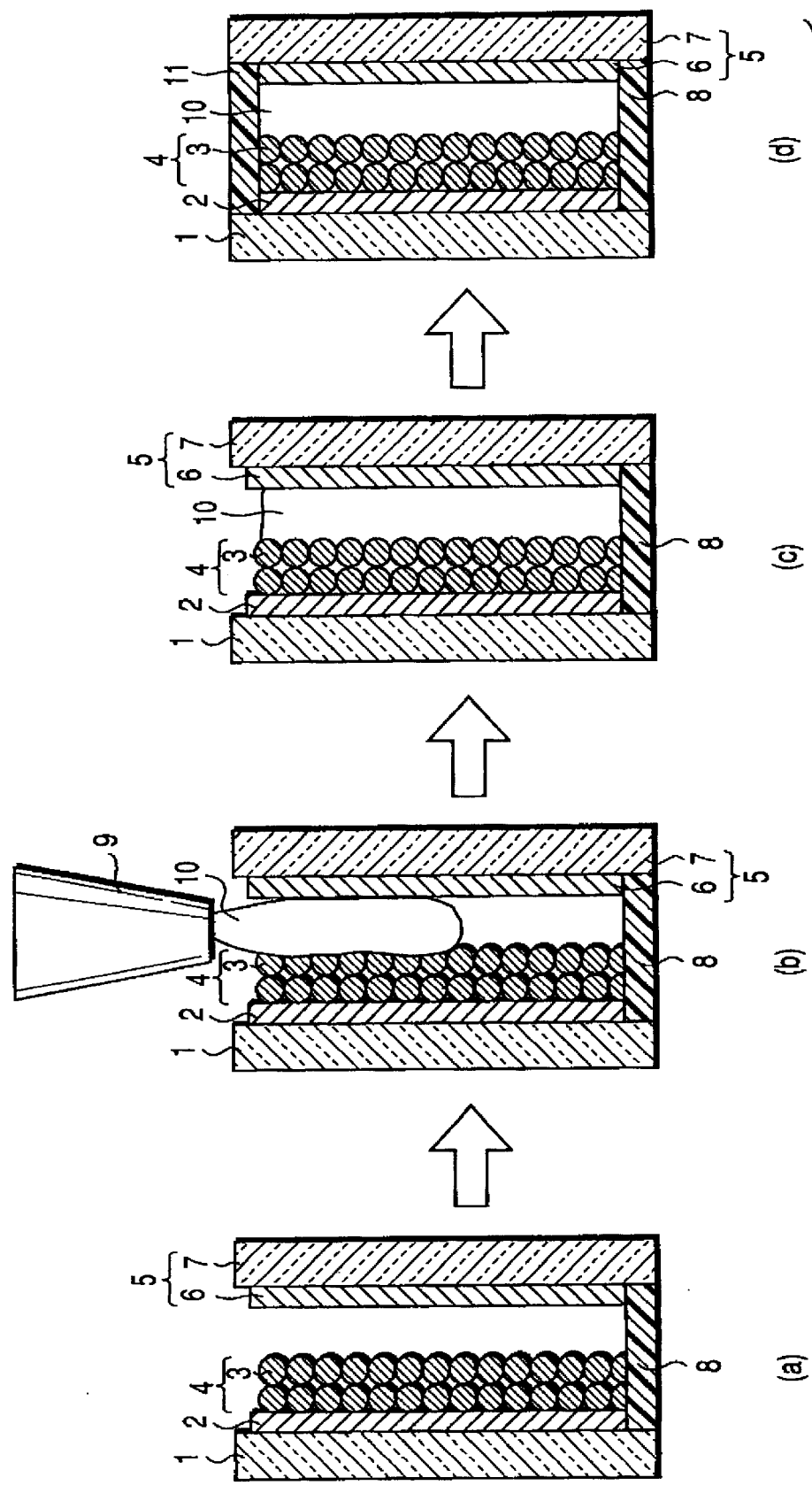
FIG. 1 schematically shows the process of manufacturing a dye sensitized solar cell in Example 1 of the present invention.

The electrolyte composition of the present invention comprises an electrolyte containing at least one kind of an imidazolium salt selected from the group consisting of 1-methyl-3-propyl imidazolium iodide given by formula (1) below, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide; a halogen-containing compound dissolved in the electrolyte; and a compound dissolved in the electrolyte and containing at least one element A selected from the group consisting of N, P and S, the compound being capable of forming an onium salt together with the halogen-containing compound. incidentally, the electrolyte is in the form of a liquid.

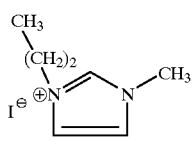

Formula (1)

The imidazolium salt is a compound that is scarcely crystallized until the temperature is lowered to about −20° C. and is not decomposed until the temperature is elevated to about 200° C. In other words, the imidazolium salt is in the form of a liquid under temperatures falling within a range of between −20° C. and 200° C.

The electrolyte composition can be prepared by, for example, dissolving the compound containing the element A and the halogen-containing compound in the electrolyte. The resultant electrolyte composition is in the form a liquid. Also, the electrolyte A is prepared by dissolving the compound having said element A in said electrolyte, and the electrolyte B is prepared by dissolving the halogen-containing compound in said electrolyte. The electrolytes A and B thus prepared are stored. The electrolytes A and B thus prepared are mixed when required, and the mixed electrolyte thus prepared can be used as an electrolyte composition.

It is desirable for the electrolyte to contain a reversible redox couple.

The reversible redox couple can be supplied from, for example, a mixture of iodine ($I_2$) and an iodide, an iodide, a bromide, hydroquinone, and a TCNQ complex. Particularly, it is desirable to use a redox couple consisting of $I^-$ and $I_3^-$ supplied from a mixture of iodine and an iodide.

It is desirable for the redox couple to exhibit a redox potential lower by 0.1 to 0.6V than an oxidation potential of a dye described herein later. In the redox couple exhibiting a redox potential lower by 0.1 to 0.6V than an oxidation potential of the dye, a reducing species such as $I^-$ is capable of receiving holes from the oxidized dye. In the electrolyte containing this redox couple, the charge transfer between the n-type semiconductor electrode and the conductive film is promoted, and the open-circuit voltage can be increased.

It is also desirable for the electrolyte to contain iodine. Also, it is possible for the electrolyte to contain an iodide. -The iodide contained in the electrolyte of the present invention includes, for example, an iodide of an alkali metal, an organic iodide, and the molten salt of the iodide.

The molten salt of the iodide used in the present invention includes iodides of a heterocyclic compound having a nitrogen atom such as imidazolium salt, pyridinium salt, quaternary ammonium salt, pyrrolidinium salt, pyrazolidinium salt, isothiazolidinium salt and isoxazolidinium salt.

The molten salt of the iodide used in the present invention includes, for example, 1,1-dimethyl imidazolium iodide, 1-methyl-3-ethyl imidazolium iodide, 1-methyl-3-pentyl imidazolium iodide, 1-methyl-3-isopentyl imidazolium iodide, 1-methyl-3-hexyl imidazolium iodide, 1-methyl-3-isohexyl(branch) imidazolium iodide, 1-methyl-3-ethyl imidazolium iodide, 1,2-dimethyl-3-propyl imidazole iodide, 1-ethyl-3-isopropyl imidazolium iodide, 1-propyl-3-propyl imidazolium iodide, pyrrolidinium iodide. It is possible to use a single or a plurality of compounds given above for preparation of the molten salt of the iodide.

It is possible for the electrolyte composition to contain an organic solvent. The electrolyte composition containing an organic solvent, which is low in its viscosity, is capable of permeating easily an n-type semiconductor electrode.

The organic solvent used in the present invention includes, for example, cyclic carbonates such as ethylene carbonate (EC) and propylene carbonate (PC); linear carbonates such as dimethyl carbonate, methyl ethyl carbonate and diethyl carbonate; γ-butyrolactone; acetonitrile; methyl propionate; ethyl propionate; cyclic ethers such as tetrahydrofuran and 2-methyl tetrahydrofuran; and linear ethers such as dimethoxy ethane and diethoxy ethane. These organic solvents can be used singly or in the form of a mixture of at least two of these organic solvents.

It is desirable for the content of the organic solvent in the electrolyte composition not to exceed 65% by weight. If the content of the organic solvent exceeds 65% by weight, the composition of the gel electrolyte tends to be markedly changed. Also, a crosslinking agent such as a compound containing element A tends to fail to be dissolved completely in the solvent so as to be precipitated in the electrolyte composition. It is desirable for the content of the organic solvent to fall within a range of between 1% by weight and 20% by weight.

It is desirable for the electrolyte composition to contain water. The electrolyte composition containing water permits further increasing the energy conversion efficiency of the photosensitized solar cell.

It is desirable for the water content of the electrolyte composition not to exceed 10% by weight with the sum of the imidazolium salt and water set at 100% by weight. It is more desirable for the water content of the electrolyte composition to fall within a range of between 0.01% by weight and 10% by weight, most desirably between 0.5% by weight and 5% by weight, with the sum of the imidazolium salt and water set at 100% by weight.

Then, the compound containing at least one element A selected from the group consisting of N, P and S and capable of forming an onium salt together with the halogen-containing compound will now be described.

It is desirable for the compound containing said element A to have at least two atomic groups having element A per molecule. It is possible for the molecule of the compound to have the same atomic groups having element A or to have different atomic groups having element A. Where the molecule in question has only one atomic group having element A, the degree of polymerization of the onium salt formed between the compound containing element A and the halogen-containing compound tends to be lowered so as to make it difficult for the electrolyte composition to gel. It is desirable for the number of atomic groups having element A per molecule of the particular compound to fall within a range of between 2 and 1,000,000.

It is possible for the compound containing element A to be in the form of, for example, a monomer, an oligomer or a polymer.

The compound containing element A includes, for example, a compound having a substituent group having at least one atom A selected from the group consisting of N, P and S in the backbone chain or in the side chain. The position of the substituent group within the compound is not particularly limited as far as it is possible to obtain a desired polymer.

The skeleton of the backbone chain of the compound containing element A, which is not particularly limited in the present invention, may be, for example, polyethylene, polyester, polycarbonate, polymethyl methacrylate, polyacrylonitrile, polyamide or polyethylene terephthalate.

At least one kind of atomic group selected from the group consisting of, for example, primary amino group, secondary amino group, tertiary amino group, phosphine group ($PH_2^-$) and an atomic group derived from a heterocyclic compound having a nitrogen atom can be used as the substituent group. It is possible for the element A-containing compound molecule to have a plurality of the same kind of substituent groups or to have a plurality of different kinds of substituent groups. Particularly, it is desirable to use at least one kind of atomic group selected from the group consisting of primary amino group, secondary amino group and tertiary amino group.

The tertiary nitrogen covering the primary amino group, secondary amino group and tertiary amino group includes, for example, amino group, N-methylamino group, N,N-dimethylamino group, N-ethylamino group, N,N-diethylamino group, N-propylamino group, N,N-dipropylamino group, N-butylamino group, and N,N-dibutylamino group.

The heterocyclic substituent having a nitrogen atom used in the present invention includes, for example, pyrrolyl group, imidazolyl group, pyrazolyl group, isothiazolyl group, isoxazolyl group, pyridyl group, pyrazinyl group, pyrimidinyl group, pyridazinyl group, indolizinyl group, isoindolyl group, indolyl group, indazolyl group, purinyl group, quinolizinyl group, isoquinolyl group, quinolyl group, phthalazinyl group, naphthyridinyl group, quinoxalinyl group, quinazolinyl group, cinnolinyl group, pheridinyl group, carbazolyl group, carbolinyl group, phenanthridinyl group, acridinyl group, perimidinyl group, phenanthrolinyl group, phenazinyl group, phenothiazinyl group, furazanyl group, phenoxazinyl group, pyrrolidinyl group, pyrrolinyl group, imidazolidinyl group, imidazolinyl group, pyrazolidinyl group, pyrazolinyl group, piperidyl group, piperazinyl group, indolinyl group, isoindolinyl group, quinuclidinyl group, morpholinyl group, 1-methyl imidazolyl group, 1-ethyl imidazolyl group, and 1-propyl imidazolyl group. It is also possible to use as the substituent group an atomic group derived from heterocyclic spiro compound having a nitrogen element or an atomic group derived from heterocyclic ring assemblies having a nitrogen element.

The N-containing compound used in the present invention includes, for example, polyvinyl imidazole, poly(4-vinyl pyridine), polybenzimidazole, bipyridyl (or pyridyl), terpyridyl, polyvinyl pyrrole, 1,3,5-tris (3-dimethyl amino) propylhexahydro-1,3,5-triazine, tris-2-aminoethylamine, polydiallylmethylamine, polyallyldimethylamine, polyallylamine, polydimethylallylamine, polydimethylaminoethylmethacrylate, and polydimethylaminoethylmethylmethacrylate. These compounds can be used singly or in the form of a mixture of at least two of these compounds. Particularly, it is desirable to use at least one compound selected from the group consisting of 2-aminoethylamine, polydiallylmethylamine, polyallyldimethylamine, polyallylamine, polydimethylallylamine, polydimethylaminoethylmethacrylate, and polydimethylaminoethylmethylmethacrylate.

The P-containing compound includes, for example, a monomer, an oligomer and a polymer each having a phosphine group. To be more specific, the P-containing compound used in the present invention includes, for example, polyvinylphenyldiphenylphosphine, 1,2-phenylenebisphosphine, 1,3-bis(diphenylphosphino) propane, 1,5-bis(diphenylphosphino)pentane. These compounds can be used singly or in the form of a mixture of at least two of these compounds.

The S-containing compounds includes, for example, a compound having a thioether (sulfide) structure. To be more specific, the S-containing compound used in the present invention includes, for example, bis(methylthio)methane, 1,1-bis (methylthio)-2-nitroethylene, (di)ethylsulfide, polyvinylphenylphenylthioether, and ethyl bis-ethylthio) acetate. These compounds can be used singly or in the form of a mixture of at least two of these compounds.

The halogen-containing compound forming a polymer together with the compound having the element A should desirably be an organic halide.

It is desirable for the molecule of the halogen-containing compound to have at least two halogen atoms. It is possible for the molecule of the halogen-containing compound to have a plurality of different kinds of halogen atoms or a plurality of the same kind of halogen atoms. If the halogen-containing compound has only one halogen atom, the degree of polymerization of the onium salt formed between the compound containing element A and the halogen-containing compound tends to be lowered so as to make it difficult for the electrolyte composition to gel. The number of halogen atoms of the halogen-containing compound should fall within a range of between 2 and 1,000,000 per molecule.

The halogen-containing compound having a plurality of halogen atoms per molecule, which is used in the present invention, includes, for example, polyfunctional halides such as dibromomethane, dibromoethane, dibromopropane, dibromobutane, dibromopentane, dibromohexane, dibromoheptane, dibromooctane, dibromononane, dibromodecane, dibromoundecane, dibromododecane, dibromotridecane, dichloromethane, dichloroethane, dichloropropane, dichlorobutane, dichloropentane, dichlorohexane, dichloroheptane, dichlorooctane, dichlorononane, dichlorodecane, dichloroundecane, dichlorododecane, dichlorotridecane, diiodomethane, diiodoethane, diiodopropane, diiodobutane, diiodopentane, diiodohexane, diiodoheptane, diiodooctane, diiodononane, diiododecane, diiodoundecane, diiodododecane, diiodotridecane, 1,2,4,5-tetrakis(bromomethyl)benzene, epichlorohydrin oligomer, epibromohydrin oligomer, hexabromocyclododecane, tris(3, 3-dibromo-2-bromopropyl)isocyanuric acid, 1,2,3-tribromopropane, diiodoperfluoroethane, diiodoperfluoropropane, diiodoperfluorohexane, polyepichlorohydrin, copolymer between a polyepichlorohydrin and a polyethylene ether, polyepibromohydrin, and polyvinyl chloride. These halogen-containing compounds can be used singly or in the form of a mixture of at least two of these compounds. Particularly, it is desirable to use an organic halide having two halogen atoms per molecule.

In the present invention, it is possible to use as the compound containing element A at least one kind of the compound selected from the compounds represented by general formulas (2) to (8) given below or to use as the halogen-containing compound at least one kind of the compound selected from the compounds represented by general formulas (2) to (8) given below. It is possible to allow the electrolyte composition to contain both the compound containing element A represented by general formulas (2) to (8) given below and the halogen-containing compound represented by general formulas (2) to (8) given below.

If 0.1% to several % of the compound represented by any of general formulas (2) to (8) is introduced into an organic solvent or into another liquid, self-organization is brought about by the hydrogen.bond caused by the hydrogen atom contained in the amide bond or the urea bond in the compound so as to cause the liquid to gel. The gelled substance is generally called a physical gel. The bond causing the hydrogen bond is not limited to the amide bond and the urea bond. It is possible for the hydrogen bond to be caused by the hydrogen atom contained in other bonds. However, the urea bond exhibits the strongest gelling power and, thus, it is desirable to use a compound having an urea bond. The electrolyte composition of the present invention is allowed to contain at least one kind of the compound selected from the compounds represented by general formulas (2) to (8) as a compound containing element A, at least one kind of the compound selected from the compounds represented by general formulas (2) to (8) as a halogen-containing compound, or at least one kind of the compound selected from the compounds represented by general formulas (2) to (8) as a compound containing element A and as a halogen-containing compound. If the viscosity of this electrolyte composition is lowered by heating, followed by cooling the composition, a physical mutual function between the compounds, i.e., self-organization of the compounds, takes place. At the same time, an addition reaction is brought about between the halogen-containing compound and the compound containing element A by the occasional addition reactive functional groups in these compounds so as to form a polymer and, thus, to cause the electrolyte composition to gel. The gel electrolyte contains the polymer formed by chemical bonds as a gelling agent, and a physical mutual function is generated among the polymers. It follows that it is possible to prevent the gel from being transformed into a sol or a liquid in accordance with the temperature elevation. As a result, it is possible to obtain a highly stable gel whose gelled state is maintained even if the temperature is elevated. It should also be noted that the gelling takes place even if the amount of the polymer is small so as to improve the electrical conductivity of the gel electrolyte.

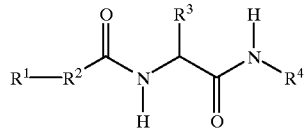

Formula (2)

where $R^1$ is a substituent group having at least one kind of atom A selected from the group consisting of N, P and S, or an organic group having a halogen atom, $R^2$ is a divalent organic group, $R^3$ is a monovalent organic group, and $R^4$ is a monovalent organic group.

The substituent groups may be those described previously. The organic groups having a halogen atom may be those derived from the organic halides described previously. The monovalent organic groups represented by $R^3$ and $R^4$ include, for example, isopropyl group, isobutyl group, sec-butyl group, tert-butyl group, nonyl group, decyl group, octadecyl group, nonadecyl group, and eicodecyl group. Particularly, it is desirable for $R^3$ to be sec-butyl group. Also, it is desirable for $R^4$ to be octadecyl group. $R^3$ and $R^4$ may be the same or different from each other.

The divalent organic groups represented by $R^2$ include, for example, oxide and methyleneoxide. Particularly, it is desirable for the divalent organic group to be methyleneoxide.

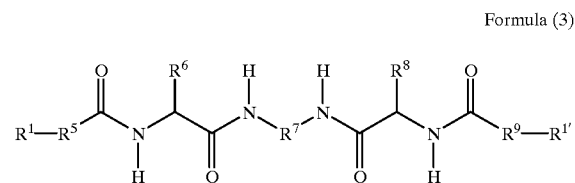

Formula (3)

where $R^1$ is a substituent group having at least one kind of atom A selected from the group consisting of N, P and S, or an organic group having a halogen atom, $R^{1'}$ is a substituent group having at least one kind of atom A selected from the group consisting of N, P and S, or an organic group having a halogen atom, $R^5$ is a divalent organic group, $R^6$ is a monovalent organic group, $R^7$ is a divalent organic group, $R^8$ is a monovalent organic group, and $R^9$ is a divalent organic group.

Where $R^1$ is the substituent group described above, $R^{1'}$ is also the substituent group described above. On the other hand, where $R^1$ is the organic group described above, $R^{1'}$ is also the organic group described above. It is possible for $R^1$ and $R^{1'}$ to be the same or different from each other. It is possible for the substituent group and the organic group having a halogen atom described above to be the same as those described in conjunction with general formula (2).

It is possible for the monovalent organic groups represented by $R^6$ and $R^8$ to be same as those described previously in conjunction with general formula (2). It is possible for $R^6$ and $R^8$ to be same or different from each other.

It is possible for the divalent organic groups represented by $R^5$, $R^7$ and $R^9$ to be those described previously in conjunction with general formula (2). Also, it is possible for $R^5$, $R^7$ and $R^9$ to be the same or different from each other.

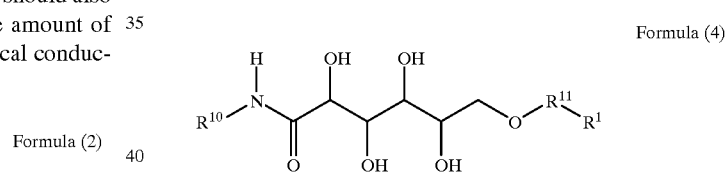

Formula (4)

where $R^1$ is a substituent group having at least one kind of atom A selected from the group consisting of N, P and S, or an organic group having a halogen atom, $R^{10}$ is a monovalent organic group, and $R^{11}$ is a divalent organic group.

It is possible for the substituent group and the organic group having a halogen atom to be those described previously in conjunction with general formula (2).

It is possible for the monovalent organic group represented by $R^{10}$ and the divalent organic group represented by $R^{11}$ to be those described previously in conjunction with general formula (2).

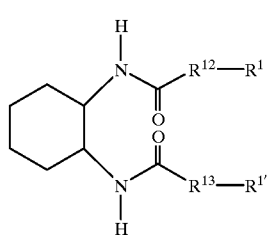

Formula (5)

where $R^1$ is a substituent group having at least one kind of atom A selected from the group consisting of N, P and S, or an organic group having a halogen atom, $R^{1'}$ is a substituent group having at least one kind of atom A selected from the group consisting of N, P and S, or an organic group having a halogen atom, $R^{12}$ is a divalent organic group, and $R^{13}$ is a divalent organic group.

Where $R^1$ in general formula (5) is the substituent group described above, $R^{1'}$ is also the substituent group described above. On the other hand, where $R^1$ is the organic group described above, $R^{1'}$ is also the organic group described above. It is possible for $R^1$ and $R^{1'}$ to be the same or different from each other. It is possible for the substituent group and the organic group having a halogen atom described above to be the same as those described previously in conjunction with general formula (2).

It is possible for the divalent organic groups represented by $R^{12}$ and $R^{13}$ to be those described previously in conjunction with general formula (2). Also, it is possible for $R^{12}$ and $R^{13}$ to be the same or different from each other.

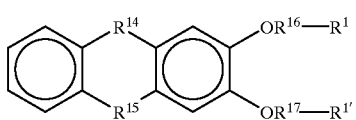

Formula (6)

where $R^1$ is a substituent group having at least one kind of atom A selected from the group consisting of N, P and S, or an organic group having a halogen atom, $R^{1'}$ is a substituent group having at least one kind of atom A selected from the group consisting of N, P and S, or an organic group having a halogen atom, $R^{14}$ is —(C=O) or —CH—, $R^{15}$ is —(C=O) or —CH—, $R^{16}$ is a divalent organic group, and $R^{17}$ is a divalent organic group.

Where $R^1$ in general formula (6) is the substituent group described above, $R^{1'}$ is also the substituent group described above. On the other hand, where $R^1$ is the organic group described above, $R^{1'}$ is also the organic group described above. It is possible for $R^1$ and $R^{1'}$ to be the same or different from each other. It is possible for the substituent group and the organic group having a halogen atom described above to be the same as those described previously in conjunction with general formula (2).

It is possible for $R^{14}$ and $R^{15}$ to be the same or different from each other.

It is possible for the divalent organic groups represented by $R^{16}$ and $R^{17}$ to be those described previously in conjunction with general formula (2). Also, it is possible for $R^{16}$ and $R^{17}$ to be the same or different from each other.

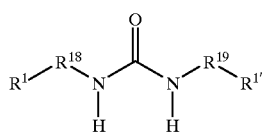

Formula (7)

where $R^1$ is a substituent group having at least one kind of atom A selected from the group consisting of N, P and S, or an organic group having a halogen atom, $R^{1'}$ is a substituent group having at least one kind of atom A selected from the group consisting of N, P and S, or an organic group having a halogen atom, $R^{18}$ is a divalent organic group, and $R^{19}$ is a divalent organic group. Where $R^1$ in general formula (7) is the substituent group described above, $R^{1'}$ is also the substituent group described above. On the other hand, where $R^1$ is Adfl the organic group described above, $R^{1'}$ is also the organic group described above. It is possible for $R^1$ and $R^{1'}$ to be the same or different from each other. It is possible for the substituent group and the organic group having a halogen atom described above to be the same as those described previously in conjunction with general formula (2).

It is possible for the divalent organic groups represented by $R^{18}$ and $R^{19}$ to be those described previously in conjunction with general formula (2). It is also possible for $R^{18}$ and $R^{19}$ to be the same or different from each other.

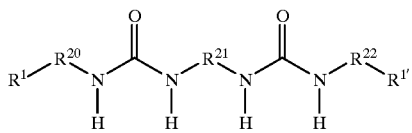

Formula (8)

where $R^1$ is a substituent group having at least one kind of atom A selected from the group consisting of N,, P and S, or an organic group having a halogen atom, $R^{1'}$ is a substituent group having at least one kind of atom A selected from the group consisting of N, P and S. or an organic group having a halogen atom, $R^{20}$ is a divalent organic group, $R^{21}$ is a monovalent organic group, and $R^{22}$ is a divalent organic group.

Where $R^1$ in general formula (8) is the substituent group described above, $R^{1'}$ is also the substituent group described above. On the other hand, where $R^1$ is the organic group described above $R^{1'}$ is also the organic group described above. It is possible for $R^1$ and $R^{1'}$ to be the same or different from each other. It is possible for the substituent group and the organic group having a halogen atom described above to be the same as those described previously in conjunction with general formula (2).

It is possible for the monovalent groups represented by $R^{21}$ to be those described previously in conjunction with general formula (2).

It is possible for the divalent organic groups represented by $R^{20}$ and $R^{22}$ to be those described previously in conjunction with general formula (2). It is also possible for $R^{20}$ and $R^{22}$ to be the same or different from each other.

A photosensitized solar cell using the electrolyte composition of the present invention and a method of manufacturing the photosensitized solar cell will now be described.

The photosensitized solar cell of the present invention comprises a substrate having a light-receiving surface, a transparent conductive film formed on the inner surface of the substrate, an n-type semiconductor electrode formed on the transparent conductive film and having a dye adsorbed on the surface, a counter electrode having a counter substrate positioned to face the n-type semiconductor electrode and a conductive film formed on that surface of the counter substrate which faces the n-type semiconductor substrate, and a gel electrolyte for relaying the charge transfer between the conductive film of the counter electrode and the n-type semiconductor electrode. The gel electrolyte contains an electrolyte containing a reversible redox couple and a polymer of an onium salt formed between a halogen-containing compound and a compound containing at least one element A selected from the group consisting of N, P and S.

Each of the gel electrolyte, the transparent conductive film, the n-type semiconductor electrode, the dye, the counter substrate, and the conductive film will now be described in the following.

1) Gel electrolyte:

The gel electrolyte is obtained by polymerizing the compound having said at least one element A and the halogen-containing compound contained in the electrolyte composition of the present invention by, for example, an addition reaction so as to allow the electrolyte composition to gel.

An example of the polymerizing reaction is shown in reaction formulas (I) to (III) given below:

Reaction Formula (I)

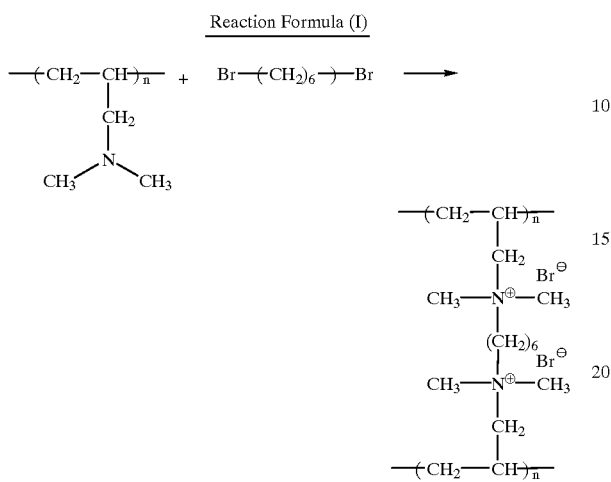

Reaction formula (I) represents the reaction to synthesize a crosslinked polymer from an onium salt having N (nitrogen) by the addition reaction between polydimethylallylamine, which is a compound having at least two atomic groups having a nitrogen atom per molecule, and 1,6-dibromobenzene, which is an organic boride having two bromine atoms per molecule. n in reaction formula (I) denotes-a natural number of 2 or more.

Reaction Formula (II)

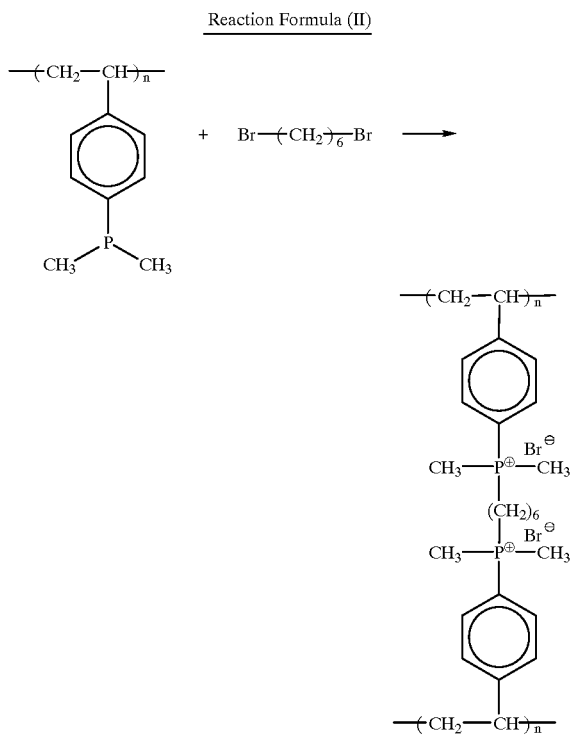

Reaction formula (II) represents the reaction to synthesize a crosslinked polymer from an onium salt having P (phosphorus) by the addition reaction between poly (phenyldimethylphosphine), which is a compound having at least two atomic groups having a phosphorus atom per molecule, and 1,6- dibromobenzene, which is an organic boride having two bromine atoms per molecule. n in reaction formula (IT) denotes a natural number of 2 or more.

Reaction Formula (III)

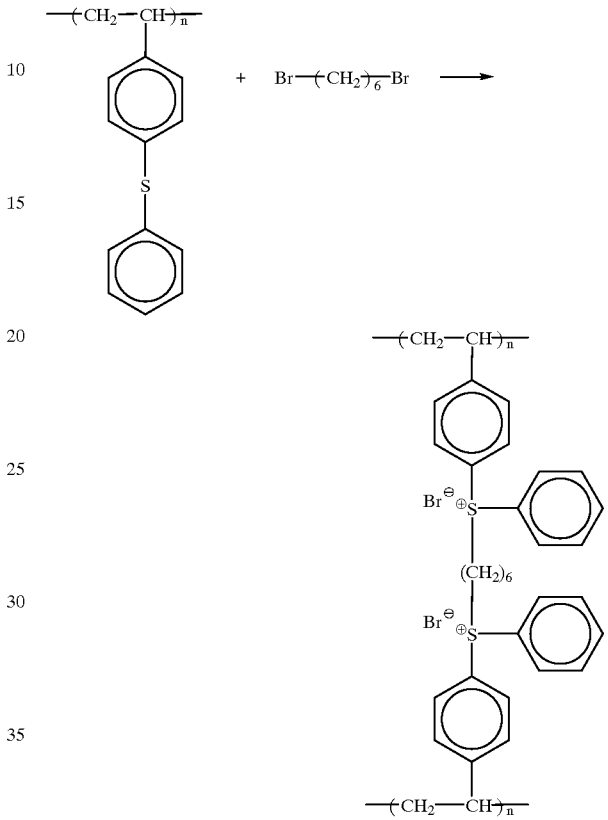

Reaction formula (III) represents the reaction to synthesize a crosslinked polymer from an onium salt having S (sulfur) by the addition reaction between poly (diphenylsulfide), which is a compound having at least two atomic groups having a sulfur atom per molecule, and 1,6-dibromobenzene, which is an organic boride having two bromine atoms per molecule. n in reaction formula (III) denotes a natural number of 2 or more.

The bond by self-organization, which is a physical bond, is formed among the crosslinked polymers from the onium salt by using as the compound containing element A at least one kind of the compound represented by general formulas (2) to (8) given above, by using as the halogen-containing compound at least one kind of the compound represented by general formulas (2) to (8) given above, or by using as the compound containing element A and as the halogen-containing compound at least one kind of the compound represented by general formulas (2) to (8) given above. As a result, it is possible to increase the stability of the gel electrolyte under high temperatures. Also, since the gelling can be brought about in a small amount of the crosslinked polymer, the crosslinked polymer content of the gel electrolyte can be decreased so as to improve the electrical conductivity of the gel electrolyte.

Transparent conductive film:

It is desirable for the transparent conductive film to be low in visible range absorption and to have an electrical conductivity. It is desirable for the transparent conductive film to be formed of a tin oxide film doped with fluorine or indium or a zinc oxide film doped with fluorine or indium. Also, in order to prevent the increase in resistivity by improving the conductivity, it is desirable to use a metal matrix having a low resistivity such as a wire in combination with the transparent conductive film.

3) n-type semiconductor electrode:

It is desirable for the n-type semiconductor electrode to be formed of a transparent semiconductor that is low in visible range absorption. A metal oxide semiconductor is desirable as such a semiconductor. To be more specific, it is desirable for the n-type semiconductor electrode to be formed of, for example, oxides of transition metals such as titanium, zirconium, hafnium, strontium, zinc, indium, yttrium, lanthanum, vanadium, niobium, tantalum, chromium, molybdenum and tungsten; perovskite semiconductors such as $SrTiO_3$, $CaTiO_3$, $BaTiO_3$, $MgTiO_3$, and $SrNb_2O_6$; composite oxides or mixtures of these oxides; and GaN.

The dyes absorbed on the surface of the n-type semiconductor electrode include, for example, a transition metal complex of ruthenium-tris type, a transition metal complex of ruthenium-his type, a transition metal complex of osmium-tris type, a transition metal complex of osmium-bis type, ruthenium-cis-diaqua-bipyridyl complexes, phthalocyanine and porphyrin.

4) Counter substrate:

It is desirable for the counter substrate to be low in visible range absorption and to have conductivity. It is also desirable for the counter substrate to be formed of a tin oxide film or a zinc oxide film.

5) Conductive film:

The conductive film can be formed of a metal such as platinum, gold or silver.

The solar cell of the present invention can be formed, for example, as follows.

In the first step, assembled is a cell unit comprising a substrate having a light-receiving surface, a transparent conductive film formed on the inner surface of the substrate, an n-type semiconductor electrode formed on the transparent conductive film and having a dye adsorbed on the surface, and a counter electrode having a counter substrate facing the n-type semiconductor electrode and a conductive film formed on that surface of the counter substrate which faces the n-type semiconductor electrode.

In the next step, the electrolyte composition of the present invention, which is a gel electrolyte precursor composition, is injected into the gap between the n-type semiconductor electrode and the conductive film and is permeated the n-type semiconductor electrode. Then, after the cell unit is sealed, the gel electrolyte precursor composition is allowed to gel so as to obtain the photosensitized solar cell of the present invention.

It is desirable to heat the cell unit in the gelling step. It is desirable for the heating temperature to fall within a range of between 50° C. and 200° C. If the heating temperature is lower than 50° C., the polymerization degree of the crosslinked polymer from the onium salt is lowered so as to make it difficult to achieve a desired gelling. On the other hand, if the heating temperature exceeds 200° C., the dye tends to be decomposed. More preferably, the heating temperature should fall within a range of between 70° C. and 150° C.

The electrolyte composition of the present invention described above contains an electrolyte containing at least one kind of an imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide; a halogen-containing compound dissolved in the electrolyte; and a compound dissolved in the electrolyte and containing at least one element A selected from the group consisting of N, P and S, the compound being capable of forming an onium salt together with the halogen-containing compound. The particular electrolyte composition forms a polymer in the presence of iodine ($I_2$) so as to gels As a synthesizing method of a polymer providing a gelling agent, it is known to the art to polymerize monomers in the presence of a small amount of a catalyst by a radical or ionic chain reaction. However, in the presence of an electrolyte containing a reversible redox couple, particularly, in the presence of an electrolyte containing iodine, the radical generators and the anion polymerization initiators fail to produce the effects thereof, resulting in failure to generate a chain polymerization. The monomers used for the polymerization include, for example, acrylic resins and epoxy resins. As another synthesizing method, known is a method of polymerization carried out while removing the low molecular weight by-products such as water and alcohols. An example of this polymerization reaction is an ester exchange reaction. Polyester, polyamide, etc. are synthesized by this method. However, the by-products formed during the polymerization give detrimental effects to the electrolyte and the dye molecule.

According to the electrolyte composition of the present invention, the polymer acting as a gelling agent can be synthesized by the addition reaction between the compound containing said at least one element A and the halogen-containing compound, making it possible to form a polymer in the presence of iodine or an ionic medium so as to convert the electrolyte composition into a gelled composition. It follows that by-products are not formed in the gelling step. In addition, since the electrolyte composition is caused to gel by a small amount (several %) of the polymer, it is possible to improve the conductivity of the gel electrolyte.

Further, the electrolyte composition of the present invention, which contains a novel electrolyte, permits suppressing the change in the composition of the gel electrolyte.

As described above, the electrolyte composition of the present invention is injected into the gap between the n-type semiconductor electrode and the conductive film and is allowed to permeate the n-type semi-conductor electrode. Then, the electrolyte composition is allowed to gel so as to obtain a photosensitized solar cell comprising the gel electrolyte. The particular photosensitized solar cell thus obtained produces prominent effects as described in items (1) to (8) given below:

(1) The shielding can be performed easily, compared with the photosensitized solar cell provided with a liquid electrolyte.

(2) The n-type semiconductor electrode has a rough surface. Since it is possible to suppress the peeling of the n-type semiconductor electrode and the gel electrolyte at the bonding interface by the heat cycle, the gel electrolyte also acts as a buffer layer during the heat cycle.

(3) Since it is possible for the electrolyte composition to gel in the presence of iodine, it is possible to use $I_3^-/I^-$ as a reversible redox couple.

(4) Since the gel electrolyte is present in the pores of the n-type semiconductor electrode, it is possible to increase the contact area between the n-type semiconductor electrode and the electrolyte. As a result, it is possible to lower the electrical resistance of the solar cell.

(5) Since the polymer acting as a gelling agent can be synthesized by an addition reaction, it is possible to avoid formation of by-products in the synthesizing step. Also, the gelling can be achieved with a small amount of the polymer. AS a result, it is possible to increase the electrical conductivity of the gel electrolyte.

(6) The solar cell of the present invention, which comprises a novel electrolyte, permits maintaining stable the composition of the gel electrolyte, even if the solar cell is used over a long period of time or the temperature of the solar cell is elevated by irradiation with the solar light.

(7) The energy conversion efficiency of the solar cell can be improved because of the effects set forth in items (4) and (6) given above.

(8) The compound having said at least one element A and the halogen-containing compound are polymerized by an addition reaction so as to chemically bonded. Therefore, it is possible to avoid the phase transfer into the gel electrolyte when the temperature of the solar cell is elevated to 50 to 70° C. by irradiation with the solar light. As a result, it is possible to prevent the liquid leakage when the temperature is elevated and to maintain a high energy conversion efficiency when the temperature is elevated.

(9) The solar cell according to the present invention takes the form of a dye-colored and transparent substrate. Because of its feature of transparency, the solar cell can be incorporated in a portable digital assistant above a liquid crystal display or an EL display.

In the electrolyte composition used in the solar cell of the present invention, at least one kind of the composition selected from the compositions represented by general formulas (2) to (8) is used as the compound having element A, at least one kind of the composition selected from the compositions represented by general formulas (2) to (8) is used as the halogen-containing compound, or at least one kind of the composition selected from the compositions represented by general formulas (2) to (8) is used as the compound having element A and as the halogen-containing compound. As a result, it is possible to allow the electrolyte composition to gel by the addition reaction between the compound having element A and the halogen-containing compound and by the physical mutual function among the polymer molecules which is formed by the addition reaction, making it possible to decrease the amount of the polymer in the electrolyte. As a result, it is possible to improve the electrical conductivity of the gel electrolyte and to improve the energy conversion efficiency of the solar cell. What should also be noted is that, since the compound having element A and the halogen-containing compound are polymerized via chemical bonds, it is possible to avoid occurrence of the phase transfer in the gel electrolyte when the temperature of the solar cell is elevated. As a result, it is possible to obtain a solar cell in which the liquid leakage is prevented when the temperature is elevated and which is capable of maintaining a high in energy conversion efficiency when the temperature is elevated.

The electrolyte composition according to another embodiment of the present invention comprises:

an electrolyte containing a reversible redox couple;

a halogen-containing compound dissolved in said electrolyte; and a compound dissolved in said electrolyte, capable of forming an onium salt together with said halogen-containing compound, and having at least one kind of a nitrogen-containing atomic group selected from the group consisting of primary amino group, secondary amino group and tertiary amino group.

In the photosensitized solar cell using the particular electrolyte composition, the gelling agent contained in the gel electrolyte, i.e., a polymer of an onium salt formed by the reaction between a compound having the nitrogen-containing atomic group referred to above and a halogen-containing compound, serves to suppress the absorption of the solar light so as to increase the transparency of the gel electrolyte. As a result, it is possible to increase the ratio of the solar light contributing to the photoelectric conversion to the entire solar light irradiating the solar cell, and to suppress the deterioration of the polymer of the onium salt caused by the solar light irradiation. As a result, it is possible to increase the energy conversion efficiency of the solar cell.

Some Examples of the present invention will now be described with reference to the accompanying drawings.

EXAMPLE 1

A paste was produced by adding nitric acid to a high purity titanium oxide (anatase) powder having an average primary particle diameter of 30 nm, kneading those together with pure water, and stabilizing a resulting material by a surfactant. The paste was printed on a dense portion formed on a glass substrate by screen printing and then heat-treated at 450° C., whereby a 2-$\mu$m thick n-type semiconductor electrode layer made of a titanium oxide (anatase) was formed. By repeating the screen printing and the heat treatment plural times, an 8-$\mu$m thick n-type semiconductor electrode 4 made of anatase-phase titanium oxide 3 was formed finally on a fluoride-doped tin oxide conductive film 2 as a transparent conductive film. The n-type semiconductor electrode 4 had a roughness factor of 1,500. The roughness factor was determined from a nitrogen absorption amount for a projection area of the substrate.

The substrate was immersed for 4 hours in a dried ethanol solution (temperature: about 80° C.) of $3 \times 10^{-4}$ mol of [cis-bis(anato)-N,N-bis(2,2'-dipyridyl-4,4'-dicarboxylic)-ruthenium (II) hydrate] and then lifted in an argon flow, whereby a ruthenium complex as a dye was carried by the surface of the n-type semiconductor electrode 4.

A glass substrate 7 on which platinum-added, fluorine-doped tin oxide electrode 6 as a counter electrode 5 was placed on the above substrate 1 formed with the n-type semiconductor electrode 4 by using spacers having a diameter of 15 $\mu$m, and the two substrates were fixed to each other by applying an epoxy resin 8 to a peripheral portion except an electrolyte liquid inlet.

FIG. 1(a) is a cross sectional view showing the photovoltaic device unit thus obtained.

An electrolyte was prepared by dissolving 0.5M of tetrapropylammonium iodide, 0.02M of potassium iodide, and 0.09M of iodine in 1-methyl-3-propyl imidazolium iodide. Then, 0.3 g of poly(4-vinylpyridine), which is a compound having a nitrogen (N) element, was dissolved in 10 g of the electrolyte, followed by further dissolving 0.3 g of 1,6-dibromohexane, which is an organic bromide, in the resultant electrolyte so as to obtain an electrolyte composition 10, which is a precursor of a gel electrolyte.

As shown in FIGS. 1(b) and 1(c), the electrolyte composition 10 was poured into an open portion of the photovoltaic device unit through a pouring port 9 so as to permit the electrolyte composition 10 to permeate into the n-type semiconductor electrode 4 and to be poured into the gap between the n-type semiconductor electrode 4 and a tin oxide electrode 6 (conductive film 6).

Figure 2:
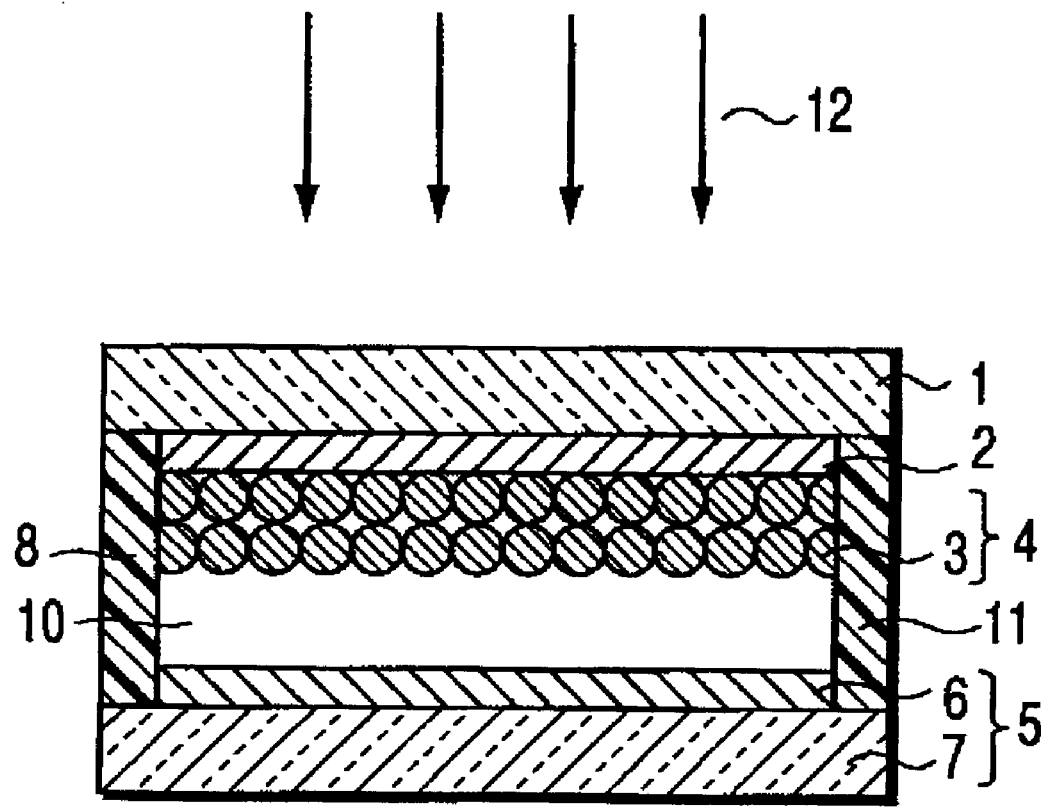
FIG. 2 is a cross sectional view showing the dye sensitized solar cell in Example 1 of the present invention.

In the next step, the open portion of the photovoltaic device unit was sealed with an epoxy resin 11 as shown in FIG. 1(*d*), followed by heating on a hot plate at 60° C. for 30 minutes so as to obtain a photovoltaic device, i.e., a dye sensitized solar cell. FIG. 2 is a cross sectional view showing the solar cell thus obtained.

As shown in FIG. 2, a transparent conductive film 2 is formed on a glass substrate 1, and a transparent n-type semiconductor electrode 4 is formed on the transparent conductive film 2. The semiconductor electrode 4, which is an aggregate of fine particles 3, has a very large surface area. Also, a monomolecular layer of dye is formed on the surface of the transparent semiconductor electrode 4. It is possible for the surface of the transparent semiconductor electrode 4 to have a fractal shape having a self-similarity like a resin-like structure. A counter electrode 5 consists of a glass substrate 7 and a conductive film 6 formed on that surface of the glass substrate 7 which faces the semiconductor electrode 4. A gel electrolyte 10 is held in the pores of the semiconductor electrode 4 and is interposed between the semiconductor electrode 4 and the conductive film 6. In the photosensitized solar cell of the particular construction, light 12 incident on the glass substrate 1 is absorbed by the dye adsorbed on the surface of the n-type semiconductor electrode 4. Then, the dye delivers the electron to the n-type semiconductor electrode 4 and, at the same time, dye delivers the hole to the gel electrolyte 10, thereby performing the photovoltaic function.

EXAMPLE 2

An electrolyte was prepared by dissolving 0.03M of iodine in 1-methyl-3-propyl imidazolium iodide. Then, 0.3 g of poly(4-vinylpyridine), which is a compound having a nitrogen (N) element, was dissolved in 10 g of the electrolyte, followed by further dissolving 0.3 g of 1,6-dibromohexane, which is an organic bromide, in the resultant electrolyte so as to obtain an electrolyte composition, which is a precursor of a gel electrolyte.

A dye sensitized solar cell was prepared as in Example 1 except the use of the electrolyte composition prepared as described above.

EXAMPLE 3

An electrolyte was prepared by dissolving 0.03M of iodine in 1-methyl-3-propyl imidazolium iodide. Then, 0.3 g of 4,4-bipyridyl, which is a compound having a nitrogen (N) element, was dissolved in 10 g of the electrolyte, followed by further dissolving 0.3 g of 1,2,4,5-tetrakis(bromomethyl) benzene, which is an organic bromide, in the resultant electrolyte so as to obtain an electrolyte composition, which is a precursor of a gel electrolyte.

A dye sensitized solar cell was prepared as in Example 1 except the use of the electrolyte composition prepared as described above.

EXAMPLE 4

A gel electrolyte composition was synthesized. Specifically, 310.3 g (2 mol) of 2-isocyanateethylmethacrylate was mixed with 114 g (1 mol) of diaminocyclohexane, and the mixture was dissolved in 1 L (liter) of dichloromethane. Then, 3 g of a polymerization inhibitor and a catalyst were added to the solution while stirring the solution, followed by condensing the system under a reduced pressure by using an evaporator so as to obtain 300 g of 1,2-bis (methacrylooxyethylureide) cyclohexane having a molecular weight of 422. 211 g (0.5 mol) of the compound thus obtained was mixed with 94 g (1 mol) of 4-aminopyridine within 1 L of toluene used as a solvent. The resultant system was subjected to reflux for one hour and, then, condensed under a reduced pressure by using an evaporator so as to obtain a desired compound A with a yield of 70%. The compound A thus obtained has a chemical structure shown in formula (9) given below:

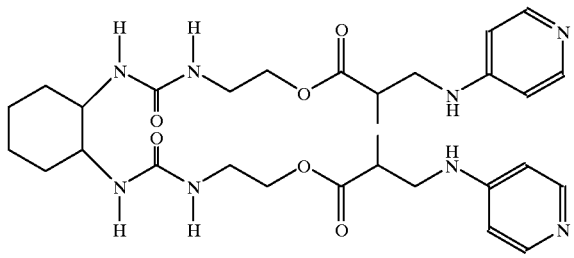

Formula (9)

0.1g of the nitrogen-containing organic compound represented by formula (9), 10 g of 1-methyl-3-propylimidazoliumiodide (electrically conductive material), 0.1 g of iodine and 0.1 g of 1,2,4,5-tetrakis(bromomethyl) benzene (halogen-containing compound) were mixed so as to prepare a solution. The solution was found to gel so as to obtain a gel electrolyte composition. Then, the gel electrolyte composition was heated at 60° C. for 10 minutes. It has been found that the gelled state is not collapsed even if the gel electrolyte composition is heated to 80° C.

EXAMPLE 5

0.3 g of the compound represented by general formula (2) given previously, in which $R^1$ represents pyridyl group, $R^2$ represents methyleneoxide, $R^3$ represents sec-butyl group, and $R^4$ represents octadecyl group, was dissolved in 10 g of the electrolyte similar to that used in Example 1. Then, 0.3 g of 1,2,4,5-tetrakis(bromomethyl)benzene was dissolved in the solution so as to obtain an electrolyte composition, which is a precursor of the gel electrolyte.

A dye sensitized solar cell was manufactured as in Example 1 except the use of the electrolyte composition thus prepared.

EXAMPLE 6

0.3 g of the compound represented by general formula (3) given previously, in which $R^1$ represents pyridyl group, $R^{1'}$ represents pyridyl group, $R^5$ represents oxide, $R^6$ represents sec-butyl group, $R^7$ represents sec-butyl group, $R^8$ represents dodecylene, and $R^9$ represents oxide, was dissolved in 10 g of the electrolyte similar to that used in Example 1. Then, 0.3 g of dibromohexane was dissolved in the solution so as to obtain an electrolyte composition, which is a precursor of the gel electrolyte.

A dye sensitized solar cell was manufactured as in Example 1 except the use of the electrolyte composition thus prepared.

EXAMPLE 7

0.3 g of the compound represented by general formula (4) given previously, in which $R^1$ represents pyridyl group, $R^{10}$ represents octyl group, and $R^{11}$ represents carbonyl, was dissolved in 10 g of the electrolyte similar to that used in Example 1. Then, 0.3 g of 1,2,4,5-tetrakis(bromomethyl) benzene was dissolved in the solution so as to obtain an electrolyte composition, which is a precursor of the gel electrolyte.

A dye sensitized solar cell was manufactured as in Example 1 except the use of the electrolyte composition thus prepared.

EXAMPLE 8

0.3 g of the compound represented by general formula (5) given previously, in which $R^1$ represents pyridyl group, $R^{1'}$ represents pyridyl group, $R^{12}$ represents undecylene, and $R^{13}$ represents undecylene, was dissolved in 10 g of the electrolyte similar to that used in Example 1. Then, 0.3 g of diiodohexane was dissolved in the solution so as to obtain an electrolyte composition, which is a precursor of the gel electrolyte.

A dye sensitized solar cell was manufactured as in Example 1 except the use of the electrolyte composition thus prepared.

EXAMPLE 9

0.3 g of the compound represented by general formula (6) given previously, in which $R^1$ represents pyridyl group, $R^{1'}$ represents pyridyl group, $R^{14}$ represents carbonyl, $R^{15}$ represents carbonyl, $R^{16}$ represents decylene, and $R^{17}$ represents decylene, was dissolved in 10 g of the electrolyte similar to that used in Example 1. Then, 0.3 g of dibromohexane was dissolved in the solution so as to obtain an electrolyte composition, which is a precursor of the gel electrolyte.

A dye sensitized solar cell was manufactured as in Example 1 except the use of the electrolyte composition thus prepared.

EXAMPLE 10

0.3 g of the compound represented by general formula (7) given previously, in which $R^1$ represents pyridyl group, $R^{1'}$ represents pyridyl group, $R^{18}$ represents decylene, and $R^{19}$ represents decylene, was dissolved in 10 g of the electrolyte similar to that used in Example 1. Then, 0.3 g of dibromohexane was dissolved in the solution so as to obtain an electrolyte composition, which is a precursor of the gel electrolyte.

A dye sensitized solar cell was manufactured as in Example 1 except the use of the electrolyte composition thus prepared.

EXAMPLE 11

0.3 g of the compound represented by general formula (8) given previously, in which $R^1$ represents pyridyl group, $R^{1'}$ represents pyridyl group, $R^{20}$ represents carbonyl, $R^{21}$ represents nonylene, and $R^{22}$ represents carbonyl, was dissolved in 10 g of the electrolyte similar to that used in Example 1. Then, 0.3 g of dibromohexane was dissolved in the solution so as to obtain an electrolyte composition, which is a precursor of the gel electrolyte.

A dye sensitized solar cell was manufactured as in Example 1 except the use of the electrolyte composition thus prepared.

EXAMPLE 12

0.3 g of 4,4'-bipyridyl was dissolved in 10 g of the electrolyte similar to that used in Example 1. Then, 0.3 g of the halogen-containing compound represented by general formula (2) given previously, in which $R^1$ represents bromine, $R^2$ represents methyleneoxide, $R^3$ represents sec-butyl group, and $R^4$ represents octadecyl group, was dissolved in the resultant solution so as to obtain an electrolyte composition, which is a precursor of the gel electrolyte.

A dye sensitized solar cell was manufactured as in Example 1 except the use of the electrolyte composition thus prepared.

EXAMPLE 13

0.3 g of bipyridyl was dissolved in 10 g of the electrolyte similar to that used in Example 1. Then, 0.3 g of the halogen-containing compound represented by general formula (3) given previously, in which $R^1$ represents bromine, $R^{1'}$ represents bromine, $R^5$ represents oxide, $R^6$ represents sec-butyl group, $R^7$ represents sec-butyl group, RB represents dodecylene, and $R^9$ represents oxide, was dissolved in the resultant solution so as to obtain an electrolyte composition, which is a precursor of the gel electrolyte.

A dye sensitized solar cell was manufactured as in Example 1 except the use of the electrolyte composition thus prepared.

EXAMPLE 14

0.3 g of terpyridyl was dissolved in 10 g of the electrolyte similar to that used in Example 1. Then, 0.3 g of the halogen-containing compound represented by general formula (4) given previously, in which $R^1$ represents iodine, $R^{10}$ represents octyl group, and $R^{11}$ represents carbonyl, was dissolved in the resultant solution so as to obtain an electrolyte composition, which is a precursor of the gel electrolyte.

A dye sensitized solar cell was manufactured as in Example 1 except the use of the electrolyte composition thus prepared.

EXAMPLE 15

0.3 g of bipyridyl was dissolved in 10 g of the electrolyte similar to that used in Example 1. Then, 0.3 g of the halogen-containing compound represented by general formula (5) given previously, in which $R^1$ represents bromine, $R^{1'}$ represents bromine, $R^{12}$ represents undecylene, and $R^{13}$ represents undecylene, was dissolved in the resultant solution so as to obtain an electrolyte composition, which is a precursor of the gel electrolyte.

A dye sensitized solar cell was manufactured as in Example 1 except the use of the electrolyte composition thus prepared.

EXAMPLE 16

0.3 g of bipyridyl was dissolved in 10 g of the electrolyte similar to that used in Example 1. Then, 0.3 g of the halogen-containing compound represented by general formula (6) given previously, in which $R^1$ represents bromine, $R^{1'}$ represents bromine, $R^{14}$ represents carbonyl, $R^{15}$ represents carbonyl, $R^{16}$ decylene represents, and $R^{17}$ represents decylene, was dissolved in the resultant solution so as to obtain an electrolyte composition, which is a precursor of the gel electrolyte.

A dye sensitized solar cell was manufactured as in Example 1 except the use of the electrolyte composition thus prepared.

EXAMPLE 17

0.3 g of terpyridyl was dissolved in 10 g of the electrolyte similar to that used in Example 1. Then, 0.3 g of the halogen-containing compound represented by general formula (7) given previously, in which $R^1$ represents bromine, $R^{1'}$ represents bromine, $R^{18}$ represents decylene, and $R^{19}$ represents decylene, was dissolved in the resultant solution so as to obtain an electrolyte composition, which is a precursor of the gel electrolyte.

A dye sensitized solar cell was manufactured as in Example 1 except the use of the electrolyte composition thus prepared.

EXAMPLE 18

0.3 g of bipyridyl was dissolved in 10 g of the electrolyte similar to that used in Example 1. Then, 0.3 g of the halogen-containing compound represented by general formula (8) given previously, in which $R^1$ represents chlorine, $R^{1'}$ represents chlorine, $R^{20}$ represents carbonyl, $R^{21}$ represents nonylene, and $R^{22}$ represents carbonyl, was dissolved in the resultant solution so as to obtain an electrolyte composition, which is a precursor of the gel electrolyte.

A dye sensitized solar cell was manufactured as in Example 1 except the use of the electrolyte composition thus prepared.

EXAMPLE 19

0.5 g of polyvinylphenyldiphenylphosphine, which is a compound containing phosphorus P, was dissolved in 10 g of the electrolyte similar to that used in Example 1. Then, 0.5 g of 1,6-dibromohexane, which is an organic halide, was dissolved in the resultant solution so as to obtain an electrolyte composition, which is a precursor of the gel electrolyte.

Then, a dye sensitized solar cell was manufactured as in Example 1. except that the electrolyte composition thus prepared was used and that the heat treating temperature for the gelling was set at 100° C.

EXAMPLE 20

0.3 g of 1,5-bis(diphenyl)phosphinopentane, which is a compound containing phosphorus P, was dissolved in 10 g of the electrolyte similar to that used in Example 1. Then, 0.3 g of epichlorohydrin oligomer, which is an organic halide, was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at loot.

EXAMPLE 21

0.1 g of polyvinylphenylphenylthioether, which is a compound containing sulfur S, was dissolved in 10 g of the electrolyte similar to that used in Example 1. Then, 0.3 g of epibromohydrin oligomer, which is an organic halide, was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at loot.

EXAMPLE 22

1 g of diethylsulfide, which is a compound containing sulfur S, was dissolved in 10 g of the electrolyte similar to that used in Example 1. Then, 0.3 g of epibromohydrin oligomer, which is an organic halide, was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at 100° C.

EXAMPLE 23

0.3 g of a compound mixture consisting of polyvinyl pyridine, which is a compound containing nitrogen N. polyvinylphenyldiphenylphosphine, which is a compound containing P, was dissolved in 10 g of the electrolyte similar to that used in Example 1. Then, 0.3 g of diiodopropane, which is an organic halide, was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at 100° C.

EXAMPLE 24

0.3 g of polyvinyl imidazole, which is a compound containing nitrogen N, was dissolved in 10 g of the electrolyte similar to that used in Example 1. Then, 0.3 g of epichlorohydrin oligomer, which is an organic halide, was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at 100° C.

EXAMPLE 25

0.3 g of polyallyldimethylamine, which is a compound containing nitrogen N, was dissolved in 10 g of the electrolyte similar to that used in Example 1. Then, 0.5 g of 1,6-dibromohexane was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at loot.

EXAMPLE 26

0.2 g of polybenzimidazole, which is a compound containing nitrogen N, was dissolved in 10 g of the electrolyte similar to that used in Example 1. Then, 0.3 g of a mixture consisting of dichlorohexane, which is an organic chloride, and dibromohexane, which is an organic boride, was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at 100t.

EXAMPLE 27

0.2 g of polydimethylaminoethylmethacrylate was dissolved in 10 g of the electrolyte similar to that used in Example 1. Then, 0.4 g of 1,6-dibromohexane was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at 100° C.

EXAMPLE 28

0.2 g of polydiallylmethylamine was dissolved in 10 g of the electrolyte similar to that used in Example 1. Then, 0.4 g of 1,6-dibromohexane was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at 100° C.

EXAMPLE 29

0.2 g of polyallylamine was dissolved in 10 g of the electrolyte similar to that used in Example 1. Then, 0.3 g of 1,6-dibromohexane was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at 100° C.

EXAMPLE 30

0.2 g of tris-2-aminoethylamine was dissolved in 10 g of the electrolyte similar to that used in Example 1. Then, 0.3 g of 1,6-dibromohexane was dissolved in the resultant solution so as to obtain an electrolyte composition, which is a precursor of the gel electrolyte.

Then, a dye sensitized solar cell was manufactured as in Example 1, except that the electrolyte composition thus prepared was used and that the heat treating temperature for the gelling was set at loot.

EXAMPLE 31

A solution was prepared by dissolving 0.09M of iodine in a mixed solvent consisting of 99.5% by weight of 1-methyl-3-propyl imidazolium iodide and 0.5% by weight of water. Then, 0.2 g of poly(4-vinylpyridine), which is a nitrogen-containing compound, was dissolved in 10 g of the solution thus prepared. Further, 0.2 g of 1,6-dibromohexane, which is an organic bromide, was dissolved in the resultant solution so as to obtain an electrolyte composition, which is a precursor of a gel electrolyte.

A dye sensitized solar cell was manufactured as in Example 1, except that used was the electrolyte composition thus prepared.

EXAMPLE 32

A solution was prepared by dissolving 0.5M of tetrapropylammonium iodide, and 0.09M of iodine in a solvent prepared by adding propylene carbonate to 1-methyl-3-propyl imidazolium iodide. Then, 0.3 g of poly(4-vinylpyridine) was dissolved in 10 g of the solution thus prepared. Further, 0.3 g of 1,6-dibromohexane, which is an organic bromide, was dissolved in the resultant solution so as to obtain an electrolyte composition, which is a precursor of a gel electrolyte. The content of propylene carbonate in the electrolyte composition was found to be 20% by weight.

A dye sensitized solar cell was manufactured as in Example 1, except that used was the electrolyte composition thus prepared.

EXAMPLE 33

An electrolyte was prepared by dissolving 0.5M of potassium iodide, and 0.09M of iodine in 1-methyl-3-isopropyl imidazolium iodide. Then, 0.3 g of poly(4-vinylpyridine) was dissolved in 10 g of the electrolyte thus prepared. Further, 0.3 g of 1,6-dibromohexane, which is an organic bromide, was dissolved in the resultant solution so as to obtain an electrolyte composition, which is a precursor of a gel electrolyte.

A dye sensitized solar cell was manufactured as in Example 1, except that used was the electrolyte composition thus prepared.

EXAMPLE 34

An electrolyte was prepared by dissolving 0.09M of iodine in a mixed solvent consisting of 1-methyl-3-propyl imidazolium iodide and 1-methyl-3-butyl imidazolium iodide. Then, 0.3 g of poly(4-vinylpyridine) was dissolved in 10 g of the electrolyte thus prepared. Further, 0.3 g of 1,6-dibromohexane, which is an organic bromide, was dissolved in the resultant solution so as to obtain an electrolyte composition, which is a precursor of a gel electrolyte.

A dye sensitized solar cell was manufactured as in Example 1, except that used was the electrolyte composition thus prepared.

Comparative Example 1

0.2 g of polyacrylonitrile, which is a compound causing a self-organization, was dissolved in 10 g of the electrolyte similar to that used in Example 1 so as to prepare an electrolyte composition, which is a precursor of the gel electrolyte.

The electrolyte composition thus prepared was poured through a pouring port into the open portion of a photovoltaic device unit similar to that described previously in conjunction with Example 1 so as to allow the electrolyte composition to permeate into the n-type semiconductor electrode and to be poured into the gap between the n-type semiconductor electrode and the tin oxide electrode (conductive film).

In the next step, the open portion of the photovoltaic device unit was sealed with an epoxy resin, followed by heating on a hot plate at 50° C. for 200 minutes so as to manufacture a photovoltaic device, i.e., a dye sensitized solar cell.

Comparative Example 2

An electrolyte was prepared by dissolving 0.5M of lithium iodide and 0.05M of iodine in acetonitrile. Added to 90% by weight (90 g) of the electrolyte was 10% by weight (10 g) of poly(4-vinylpyridine) having a molecular weight of 10,000. However, since poly(4-vinylpyridine) was not dissolved in acetonitrile, it was impossible to obtain an electrolyte composition.

Comparative Example 3

An electrolyte was prepared by dissolving 0.5M of lithium iodide and 0.05M of iodine in propylene carbonate.

Then, 10% by weight (10 g) of poly(4-vinylpyridine) having a molecular weight of 2,000 was dissolved in 90% by weight of the electrolyte thus prepared. Further, an electrolyte composition, which was a precursor of a gel electrolyte, was obtained by dissolving 10 g of 1,6-dibromohexane in the resultant solution.

A dye sensitized solar cell was manufactured as in Example 1, except that used was the electrolyte composition thus prepared.

The solar cell obtained in each of Examples 1 to 34 and the Comparative Examples 1 and 3 was dismantled so as to observe the state of the electrolyte. The electrolyte was found to have gelled.

Also, the photovoltaic efficiency in the case of irradiating the solar cell with a quasi-solar light having an intensity of 100 mW/cm$^2$ was measured in respect of the solar cell obtained in each of Examples 1 to 34 and the Comparative Examples 1 and 3. Table 1 shows the result. Then, the photovoltaic efficiency was measured in the case of storing the solar cell at 100° C. for 1 month, followed by irradiating the solar with a quasi-solar light having an intensity of 100 mW/cm$^2$ in respect of the solar cell obtained in each of Examples 1 to 34 and the Comparative Examples 1 and 3. The photovoltaic efficiency thus obtained was compared with the photovoltaic efficiency before the storage so as to obtain the decrease in the photovoltaic efficiency caused by the storage of the solar cell at 100° C. for 1 month. Table 1 shows the result. The rate of decrease smaller than 10% is marked A in Table 1. Also, the rate of decrease falling within a range of between 10% and 50% is marked B. Further, the rate of decrease larger than 50% is marked C in Table 1.

TABLE 1

| | Kind of element A | Kind of Halogen | Energy conversion efficiency | Decrease rate of energy conversion efficiency |
|---|---|---|---|---|
| Example 1 | N | Br | 6 | A |
| Example 2 | N | Br | 6 | A |
| Example 3 | N | Br | 7 | A |
| Example 5 | N/formula (2) | Br | 6 | A |
| Example 6 | N/formula (3) | Br | 6 | A |
| Example 7 | N/formula (4) | Br | 7 | A |
| Example 8 | N/formula (5) | I | 6 | A |
| Example 9 | N/formula (6) | Br | 6 | A |
| Example 10 | N/formula (7) | Br | 7 | A |
| Example 11 | N/formula (8) | Br | 6 | A |
| Example 12 | N | Br/formula (2) | 7 | A |
| Example 13 | N | Br/formula (3) | 6 | A |
| Example 14 | N | I/formula (4) | 6 | A |
| Example 15 | N | Br/formula (5) | 7 | A |
| Example 16 | N | Br/formula (6) | 7 | A |
| Example 17 | N | Br/formula (7) | 7 | A |
| Example 18 | N | Cl/formula (8) | 5 | A |
| Example 19 | P | Br | 8 | B |
| Example 20 | P | Cl | 8 | B |
| Example 21 | S | Br | 7 | B |
| Example 22 | S | Br | 8 | B |
| Example 23 | N, P | I | 7 | B |
| Example 24 | N | Cl | 7 | A |
| Example 25 | N | Br | 9 | A |
| Example 26 | N | Br, Cl | 7 | A |
| Example 27 | N | Br | 9 | A |

TABLE 1-continued

| | Kind of element A | Kind of Halogen | Energy conversion efficiency | Decrease rate of energy conversion efficiency |
|---|---|---|---|---|
| Example 28 | N | Br | 8 | A |
| Example 29 | N | Br | 6 | A |
| Example 30 | N | Br | 7 | A |
| Example 31 | N | Br | 10 | A |
| Example 32 | N | Br | 5 | A |
| Example 33 | N | Br | 6 | A |
| Example 34 | N | Br | 6 | A |
| Comparative Example 1 | — | — | 4 | C |
| Comparative Example 3 | — | — | 4 | C |

As apparent from Table 1, the solar cell in each of Examples 1 to 34 exhibits a high energy conversion efficiency and is low in the rate of decrease of the energy conversion efficiency caused by the temperature elevation, compared with the solar cell of the Comparative Examples 1 and 3.

In each of the Examples described above, the solar light was incident on the n-type semiconductor electrode. However, the technical idea of the present invention can also be applied to a solar cell constructed such that the solar light is incident on the counter electrode.

As described above in detail, the present invention provides an electrolyte composition that permits overcoming the problems inherent in the wet photosensitized solar cell and the full-solid-state photosensitized solar cell so as to improve the energy conversion efficiency of the solar cell and also permits obtaining a high energy conversion efficiency when the solar cell is used under a high temperature environment, and also provides a photosensitized solar cell using the particular electrolyte composition and a method of manufacturing the photosensitized solar cell.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrolyte composition, comprising:
    an electrolyte containing at least one imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide;
    a halogen-containing compound dissolved in said electrolyte; and
    a compound dissolved in said electrolyte and containing at least one element selected from the group consisting of N, P and S, said compound being capable of forming an onium salt together with said halogen-containing compound.

2. The electrolyte composition according to claim 1, wherein said compound having said at least one element has at least one atomic group selected from the group consisting of a primary amino group, a secondary amino group, a tertiary amino group, and a phosphine group (—PH$_2$).

3. The electrolyte composition according to claim 1, wherein said compound having said at least one element is at least one a compound selected from the group consisting of tris-2-aminoethylamine, polydiallylmethylamine, polyallyldimethylamine, polyallylamine, polydimethylallylamine, polydimethylaminoethylmethylmethacrylate, polydimethylaminoethylmethacrylate, polyvinylphenyldiphenylphosphine, 1,2-phenylenebisphosphine, 1,3-bis(diphenylphosphino)propane, 1,5-bis(diphenylphosphino)pentane, bis(methylthio)methane, 1,1-bis(methylthio)-2-nitroethylene, (di)ethylsulfide, polyvinylphenylphenylthioether, and ethyl (bisethylthio)acetate.

4. The electrolyte composition according to claim 1, further comprising an organic solvent.

5. The electrolyte composition according to claim 4, wherein the content of said organic solvent is not higher than 65% by weight.

6. The electrolyte composition according to claim 1, further comprising water.

7. The electrolyte composition according to claim 6, wherein the content of water is not higher than 10% by weight with the sum of water and said imidazolium salt set at 100% by weight.

8. The electrolyte composition according to claim 6, wherein the content of water falls within a range of between 0.01% by weight and 10% by weight with the sum of water and said imidazolium salt set at 100% by weight.

9. The electrolyte composition according to claim 1, wherein said halogen-containing compound is at least one compound selected from the group of compounds represented by formulas (10) to (16):

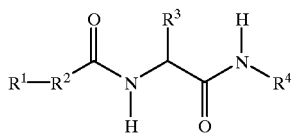

Formula (10)

where $R^1$ is an organic group having a halogen atom, $R^2$ is a divalent organic group, $R^3$ is a monovalent organic group, and $R^4$ is a monovalent organic group;

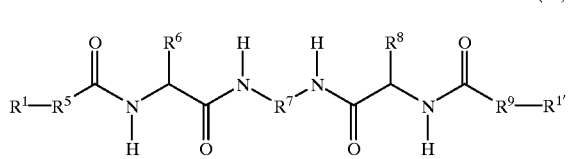

Formula (11)

where $R^1$ is an organic group having a halogen atom, $R^{1'}$ is an organic group having a halogen atom, $R^5$ is a divalent organic group, $R^6$ is a monovalent organic group, $R^7$ is a divalent organic group, $R^8$ is a monovalent organic group, and $R^9$ is a divalent organic group;

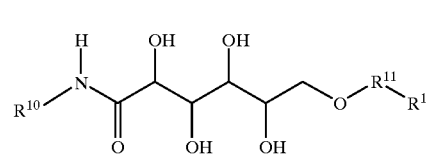

Formula (12)

where $R^1$ is an organic group having a halogen atom, $R^{10}$ is a monovalent organic group, and $R^{11}$ is a divalent organic group;

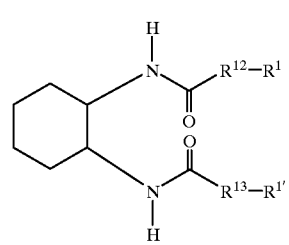

Formula (13)

where $R^1$ is an organic group having a halogen atom, $R^{1'}$ is an organic group having a halogen atom, $R^{12}$ is a divalent organic group, and $R^{13}$ is a divalent organic group;

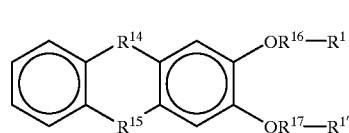

Formula (14)

where $R^1$ is an organic group having a halogen atom, $R^{1'}$ is an organic group having a halogen atom, $R^{14}$ is (C=O) or —CH—, $R^{15}$ is (C=O) or —CH—, $R^{16}$ is a divalent organic group, and $R^{17}$ is a divalent organic group;

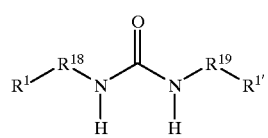

Formula (15)

where $R^1$ is an organic group having a halogen atom, $R^{1'}$ is an organic group having a halogen atom, $R^{18}$ is a divalent organic group, and $R^{19}$ is a divalent organic group;

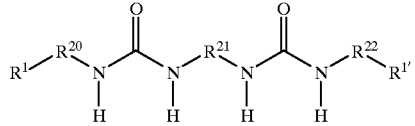

Formula (16)

where $R^1$ is an organic group having a halogen atom, $R^{1'}$ is an organic group having a halogen atom, $R^{20}$ is a divalent organic group, $R^{21}$ is a divalent organic group, and $R^{22}$ is a divalent organic group.

10. The electrolyte composition according to claim 1, wherein said compound having said at least one element is at least one compound selected from the group of compounds represented by formulas (17) to (23):

Formula (17)

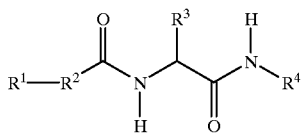

where $R^1$ is a substituent group having at least one atom selected from the group consisting of N, P and S, $R^2$ is a divalent organic group, $R^3$ is a monovalent organic group, and $R^4$ is a monovalent organic group;

Formula (18)

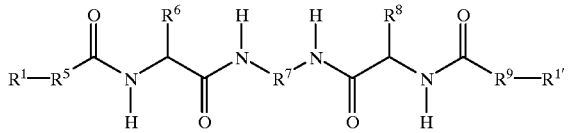

where $R^1$ is a substituent group having at least one atom selected from the group consisting of N, P and S, $R^{1'}$ is a substituent group having at least one atom selected from the group consisting of N, P, and S, $R^5$ is a divalent organic group, $R^6$ is a monovalent organic group, $R^7$ is a divalent organic group, $R^8$ is a monovalent organic group, and $R^9$ is a divalent organic group;

Formula (19)

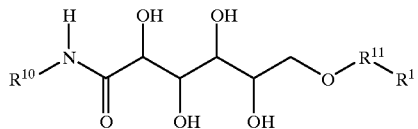

where $R^1$ is a substituent group having at least one atom selected from the group consisting of N, P and S, $R^{10}$ is a monovalent organic group, $R^{11}$ is a divalent organic group;

Formula (20)

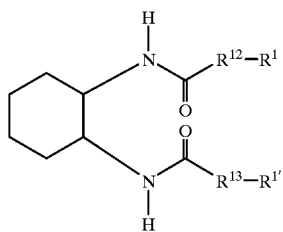

where $R^1$ is a substituent group having at least one atom selected from the group consisting of N, P and S, $R^{1'}$ is a substituent group having at least one atom selected from the group consisting of N, P and S, $R^{12}$ is a divalent organic group, and $R^{13}$ is a divalent organic group;

Formula (21)

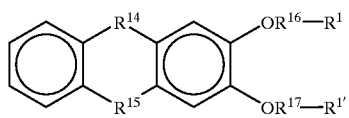

where $R^1$ is a substituent group having at least one atom selected from the group consisting of N, P and S, $R^{1'}$ is a substituent group having at least one atom selected from the group consisting of N, P and S, $R^{14}$ is (C=O) or —CH—, $R^{15}$ is (C=O) or —CH—, $R^{16}$ is a divalent organic group, and $R^{17}$ is a divalent organic group;

Formula (22)

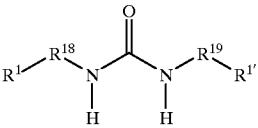

where $R^1$ is a substituent group having at least one atom selected from the group consisting of N, P and S, $R^{1'}$ is a substituent group having at least one atom selected from the group consisting of N, P and S, $R^{18}$ is a divalent organic group, and $R^{19}$ is a divalent organic group;

Formula (23)

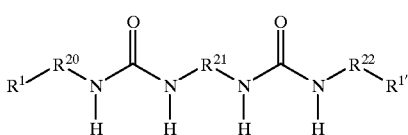

where $R^1$ is a substituent group having at least one atom selected from the group consisting of N, P and S, $R^{1'}$ is a substituent group having at least one atom selected from the group consisting of N, P and S, $R^{20}$ is a divalent organic group, $R^{21}$ is a divalent organic group, and $R^{22}$ is a divalent organic group.

11. A photosensitized solar cell, comprising:
an n-type semiconductor electrode having a surface on which a dye is adsorbed;
a counter substrate arranged to face said n-type semiconductor electrode;
a conductive film formed on that surface of the counter substrate which faces the n-type semiconductor electrode; and
a gel electrolyte serving to relay the charge transfer between said conductive film and said n-type semiconductor electrode, and said gel electrolyte containing a polymer of an onium salt formed between a halogen-containing compound and a compound containing at least one element selected from the group consisting of N, P and S, and an electrolyte containing at least one imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide.

12. The photosensitized solar cell according to claim 11, wherein said halogen-containing compound is an organic halide having two halogen atoms per molecule.

13. The photosensitized solar cell according to claim 11, wherein said compound having said at least one element has at least one atomic group selected from the group consisting of a primary amino group, a secondary amino group, a tertiary amino group, and a phosphine group (—PH$_2$).

14. The photosensitized solar cell according to claim 11, wherein said compound having said at least one element is at least one compound selected from the group consisting of tris-2-aminoethylamine, polydiallylmethylamine, polyallyldimethylamine, polyallylamine, polydimethylallylamine, polydimethylaminoethylmethacrylate, polydimethylaminoethylmethylmethacrylate, polyvinylphenyldiphenylphosphine, 1,2-phenylenebisphosphine, 1,3-bis(diphenylphosphino) propane, 1,5-bis(diphenylphosphino)pentane, bis (methylthio)methane, 1,1-bis(methylthio)-2-nitroethylene, (di)ethylsulfide, polyvinylphenylthioether, and ethyl (bisethylthio)acetate.

15. The photosensitized solar cell according to claim 11, wherein said gel electrolyte further contains an organic solvent.

16. The photosensitized solar cell according to claim 15, wherein the content of said organic solvent in said gel electrolyte is not higher than 65% by weight.

17. The photosensitized solar cell according to claim 15, wherein the content of said organic solvent in said gel electrolyte falls within a range of between 1% by weight and 20% by weight.

18. The photosensitized solar cell according to claim 11, wherein said gel electrolyte further contains water.

19. The photosensitized solar cell according to claim 18, wherein the content of water in said gel electrolyte is not higher than 10% by weight with the sum of water and said imidazolium salt set at 100% by weight.

20. The photosensitized solar cell according to claim 18, wherein the content of water in said gel electrolyte falls within a range of between 0.01% by weight and 10% by weight with the sum of water and said imidazolium salt set at 100% by weight.

21. The photosensitized solar cell according to claim 18, wherein the content of water in said gel electrolyte falls within a range of between 0.5% by weight and 5% by weight with the sum of water and said imidazolium salt set at 100% by weight.

22. The photosensitized solar cell according to claim 11, wherein said halogen-containing compound is at least one compound selected from the group of compounds of formulas (10) to (16):

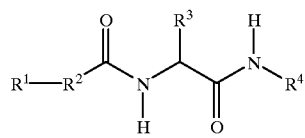
Formula (10)

where $R^1$ is an organic group having a halogen atom, $R^2$ is a divalent organic group, $R^3$ is a monovalent organic group, and $R^4$ is a monovalent organic group;

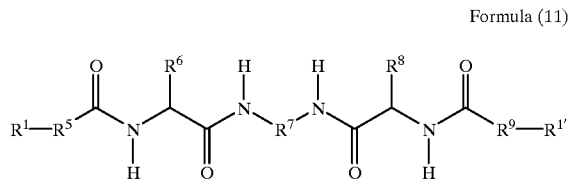
Formula (11)

where $R^1$ is an organic group having a halogen atom, $R^{1'}$ is an organic group having a halogen atom, $R^5$ is a divalent organic group, $R^6$ is a monovalent organic group, $R^7$ is a divalent organic group, $R^8$ is a monovalent organic group, and $R^9$ is a divalent organic group;

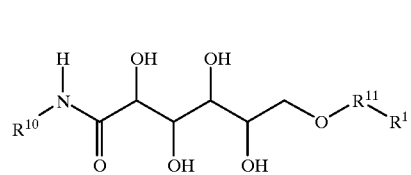
Formula (12)

where $R^1$ is an organic group having a halogen atom, $R^{10}$ is a monovalent organic group, and $R^{11}$ is a divalent organic group;

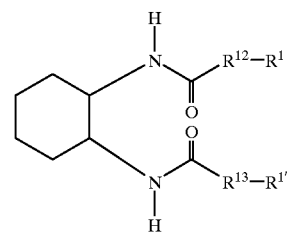
Formula (13)

where $R^1$ is an organic group having a halogen atom, $R^{1'}$ is an organic group having a halogen atom, $R^{12}$ is a divalent organic group, and $R^{13}$ is a divalent organic group;

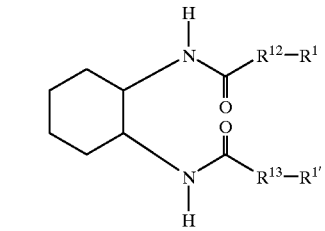
Formula (14)

where $R^1$ is an organic group having a halogen atom, $R^{1'}$ it is an organic group having a halogen atom, $R^{14}$ is (C=O) or —CH—, $R^{15}$ is (C=O) or —CH—, $R^{16}$ is a divalent organic group, and $R^{17}$ is a divalent organic group;

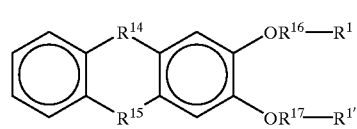
Formula (15)

where $R^1$ is an organic group having a halogen atom, $R^{1'}$ is an organic group having a halogen atom, $R^{18}$ is a divalent organic group, and $R^{19}$ is a divalent organic group;

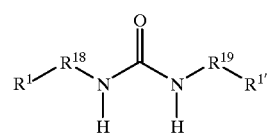
Formula (16)

where $R^1$ is an organic group having a halogen atom, $R^{1'}$ is an organic group having a halogen atom, $R^{20}$ is a divalent organic group, $R^{21}$ is a divalent organic group, and $R^{22}$ is a divalent organic group.

23. The photosensitized solar cell according to claim 11, wherein said compound having said at least one element is at least one compound selected from the compounds of formulas (17) to (23):

Formula (17)

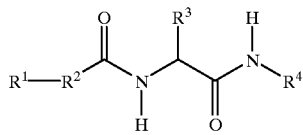

where $R^1$ is a substituent group having at least one atom selected from the group consisting of N, P and S, $R^2$ is a divalent organic group, $R^3$ is a monovalent organic group, and $R^4$ is a monovalent organic group;

Formula (18)

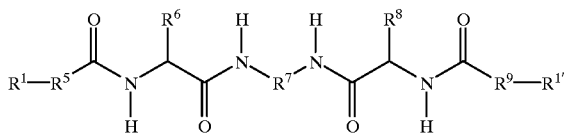

where $R^1$ is a substituent group having at least one atom selected from the group consisting of N, P and S, $R^{1'}$ is a substituent group having at least one atom selected from the group consisting of N, P and S, $R^5$ is a divalent organic group, $R^6$ is a monovalent organic group, $R^7$ is a divalent organic group, $R^8$ is a monovalent organic group, and $R^9$ is a divalent organic group;

Formula (19)

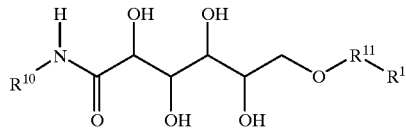

where $R^1$ is a substituent group having at least one atom selected from the group consisting of N, P and S, $R^{10}$ is a monovalent organic group, and $R^{11}$ is a divalent organic group;

Formula (20)

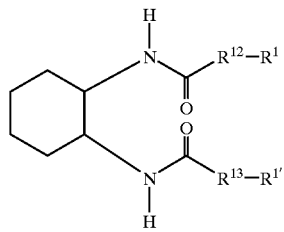

where $R^1$ is a substituent group having at least one atom selected from the group consisting of N, P and S, $R^{1'}$ is a substituent group having at least one atom selected from the group consisting of N, P and S, $R^{12}$ is a divalent organic group, and $R^{13}$ is a divalent organic group;

Formula (21)

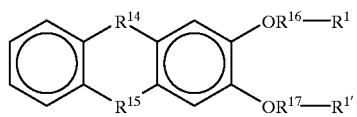

where $R^1$ is a substituent group having at least one atom selected from the group consisting of N, P and S, $R^{1'}$ is a substituent group having at least one atom selected from the group consisting of N, P and S, $R^{14}$ is (C=O) or —CH—, $R^{15}$ is (C=O) or —CH—, $R^{16}$ is a divalent organic group, and $R^{17}$ is a divalent organic group;

Formula (22)

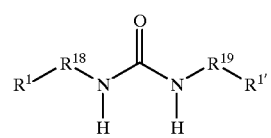

where $R^1$ is a substituent group having at least one atom selected from the group consisting of N, P and S, $R^{1'}$ is a substituent group having at least one atom selected from the group consisting of N, P and S, $R^{18}$ is a divalent organic group, and $R^{19}$ is a divalent organic group;

Formula (23)

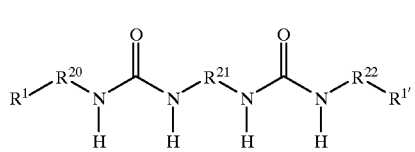

where $R^1$ is a substituent group having at least one atom selected from the group consisting of N, P and S, $R^{1'}$ is a substituent group having at least one atom selected from the group consisting of N, P and S, $R^{20}$ is a divalent organic group, $R^{21}$ is a divalent organic group, and $R^{22}$ is a divalent organic group.

24. A method of manufacturing a photosensitized solar cell comprising an n-type semiconductor electrode having a surface on which a dye is adsorbed, a counter substrate arranged to face said n-type semiconductor electrode, a conductive film formed on that surface of said counter substrate which faces the n-type semiconductor electrode, and a gel electrode serving to relay the charge transfer between the conductive film and the n-type semiconductor electrode, said method comprising the steps of:

allowing an electrolyte composition to be injected into a gap between the n-type semiconductor electrode and the conductive film and to permeate said n-type semiconductor electrode, and said electrolyte composition comprises an electrolyte containing at least one imidazolium salt selected from the group consisting of 1-methyl-3-propyl imidazolium iodide, 1-methyl-3-isopropyl imidazolium iodide, 1-methyl-3-butyl imidazolium iodide, 1-methyl-3-isobutyl imidazolium iodide and 1-methyl-3-sec-butyl imidazolium iodide, a halogen-containing compound dissolved in said electrolyte and a compound dissolved in said electrolyte and containing at least one element selected from the group consisting of N, P and S, and said compound being capable of forming an onium salt together with said halogen-containing compound; and forming a polymer of an onium salt between said compound having said at least one element and said halogen-containing compound so as to allow said electrolyte composition to gel, thereby obtaining a gel electrolyte.

25. The method of manufacturing a photosensitized solar cell according to claim 24, wherein a heat treatment is applied at 50 to 200° C. in the gelling step.

* * * * *